United States Patent
Zelov et al.

(10) Patent No.: US 8,943,601 B1
(45) Date of Patent: Jan. 27, 2015

(54) METHOD AND APPARATUS FOR EXECUTING AN APPLICATION IN A DIFFERENT APPLICATION FRAMEWORK

(75) Inventors: Roman A. Zelov, Saint-Petersburg (RU); Alexey S. Popov, Saint-Petersburg (RU); Vladimir V. Sizikov, Santa Clara, CA (US); Nedim Fresko, San Francisco, CA (US); Roger S. Riggs, Burlington, MA (US)

(73) Assignee: Oracle America, Inc, Redwood Shores, CA (US)

( * ) Notice: Subject to any disclaimer, the term of this patent is extended or adjusted under 35 U.S.C. 154(b) by 2146 days.

(21) Appl. No.: 11/408,127

(22) Filed: Apr. 20, 2006

(51) Int. Cl.
G06F 7/04 (2006.01)
G06F 21/10 (2013.01)
G11B 20/00 (2006.01)

(52) U.S. Cl.
CPC .......... *G06F 21/10* (2013.01); *G11B 20/00086* (2013.01)
USPC ......................................................... 726/26

(58) Field of Classification Search
CPC ........................ G06F 21/10; G11B 20/00086
USPC ................................ 726/22–26; 713/200–201
See application file for complete search history.

(56) References Cited

U.S. PATENT DOCUMENTS

| | | | |
|---|---|---|---|
| 7,308,706 B2* | 12/2007 | Markham et al. | 726/4 |
| 2003/0051073 A1* | 3/2003 | Mishra et al. | 709/332 |
| 2003/0126521 A1* | 7/2003 | Radestock | 714/100 |
| 2004/0204010 A1* | 10/2004 | Tassberg et al. | 455/550.1 |
| 2004/0243881 A1 | 12/2004 | Wang | 714/37 |
| 2007/0174899 A1* | 7/2007 | Broberg et al. | 726/4 |

\* cited by examiner

*Primary Examiner* — Anthony Brown
(74) *Attorney, Agent, or Firm* — Park, Vaughan, Fleming & Dowler LLP; Mark Spiller

(57) ABSTRACT

One embodiment of the present invention provides a system that executes an application designed for one application framework in a different application framework. First, the system receives an application designed to operate in the first application framework. The system determines a first set of security permissions used by the application in the first application framework, and maps these security permissions into a second set of security permissions associated with the second application framework. The system then configures the second application framework to provide the second set of security permissions. These steps allow the application to execute transparently in the second application framework with substantially similar security behavior as in the first application framework.

20 Claims, 5 Drawing Sheets

METHOD AND APPARATUS FOR EXECUTING AN APPLICATION IN A DIFFERENT APPLICATION FRAMEWORK

BACKGROUND

1. Field of the Invention

The present invention relates to techniques for transferring an application into a new environment. More specifically, the present invention relates to a method and an apparatus for executing an application in a different application framework.

2. Related Art

The Java 2 Platform, Micro Edition (J2ME™), has become a popular software platform for memory-constrained devices such as wireless mobile telephones. Motorola, Nokia, NTT DoCoMo, RIM, Siemens, and many other key players in the wireless device industry have shipped a large number of J2ME-enabled devices, and the features, complexity, and popularity of such devices is increasing dramatically.

The software infrastructure which is available for these devices also continues to evolve as new technological features are developed. Such technological advances provide benefits, but they may also cause difficulties, because, for instance, a large installed base of devices might not be upgradeable to a new application framework. Additionally, porting existing tools, applications, and testing suites from a previous application framework to operate in the new application framework can involve significant effort and expense.

Hence, what is needed is a method and an apparatus for executing an application in a different application framework without the above-described problems.

SUMMARY

One embodiment of the present invention provides a system that executes an application designed for one application framework in a different application framework. First, the system receives an application designed to operate in the first application framework. The system determines a first set of security permissions used by the application in the first application framework, and maps these security permissions into a second set of security permissions associated with the second application framework. The system then configures the second application framework to provide the second set of security permissions. These steps allow the application to execute transparently in the second application framework with substantially similar security behavior as in the first application framework.

In a variation on this embodiment, the application performs a set of tests that confirm the functionality of the application framework.

In a variation on this embodiment, the application is associated with security meta-data that assists the system in determining the second set of security permissions. This security meta-data can be created when the application is created or when the application is installed.

In a further variation, the system creates the security meta-data based on a user-generated specification that specifies the first set of security permissions used by the application in the first security framework.

In a further variation, the system determines the first set of security permissions and/or the security meta-data by analyzing the application to determine the security needs of the application.

In a further variation, the system generates the first set of security permissions, the second set of security permissions, and/or the security meta-data using a mapping interface that maps security permissions from the first application framework to security permissions in the second application framework.

In a further variation, the mapping interface uses a table that maps security permission requests for the first application framework to security permissions in the second application framework.

In a variation on this embodiment, the system configures the second application framework by instantiating and configuring at runtime a security manager to receive requests for security permissions from the application. The system configures the security manager to create a special security environment for the application that matches the security permissions specified for the first application framework to equivalent security permissions in the second application framework.

In a variation on this embodiment, the first application framework includes the Mobile Information Device Profile (MIDP) application framework and the second application framework includes the Connected Device Configuration (CDC) application framework.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

Testing Application Frameworks

As mentioned previously, supporting applications and test code across multiple software environments can be challenging. One example of this involves the Java™ Mobile Information Device Profile (MIDP) and the Java™ Connected Device Configuration (CDC) framework.

Figure 1:
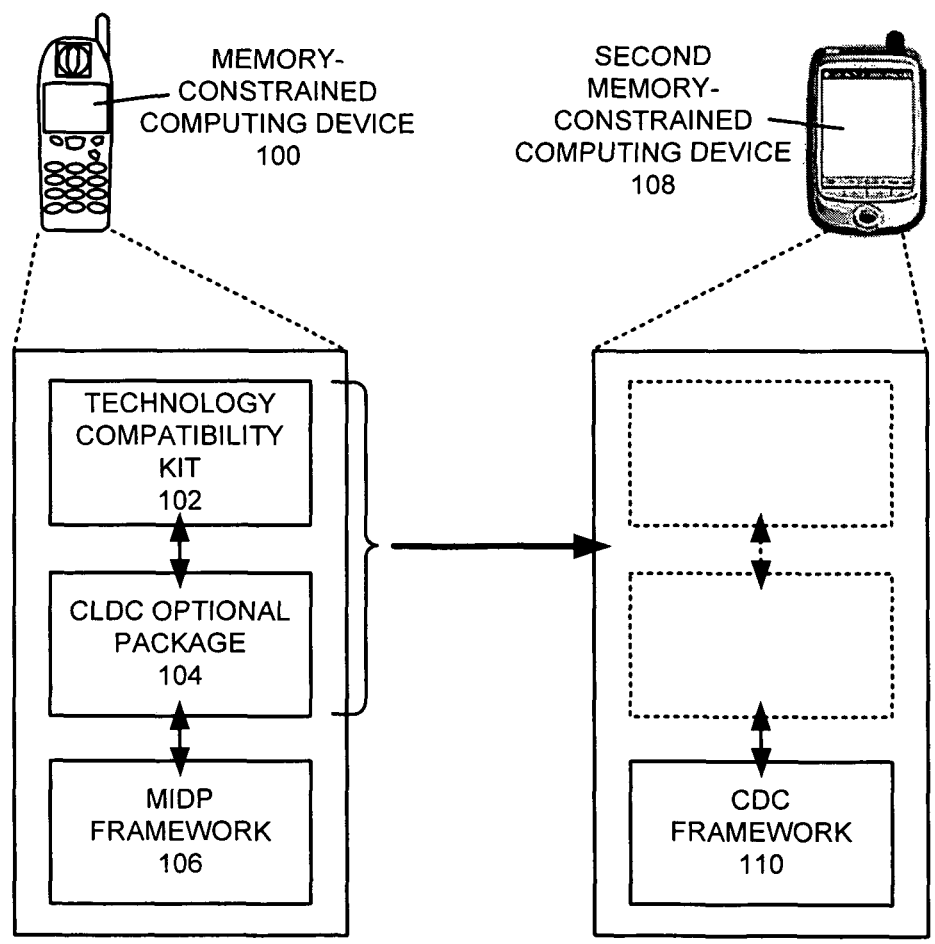
FIG. 1 illustrates a memory-constrained computing device that uses the MIDP framework in accordance with an embodiment of the present invention.

FIG. 1 illustrates a memory-constrained computing device 100 that uses the MIDP framework 106. A Connected Limited Device Configuration (CLDC) optional package 104 provides additional functionality on top of the MIDP framework 106, and supports a technology compatibility kit (TCK) 102. A TCK typically includes testing code that verifies the correct behavior of the underlying software implementation to ensure that the implementation adheres to the specification (for instance, the MIDP specification). These tests not only test the MIDP framework, but also include application mode diagnostics and pure J2ME™ tests. TCKs include wrappers that allow them to be executed in a variety of environments, for instance as Java™ applications, applets, midlets, or xlets. A number of TCKs and CLDC optional packages currently exist to test a range of features and devices.

Figure 2:
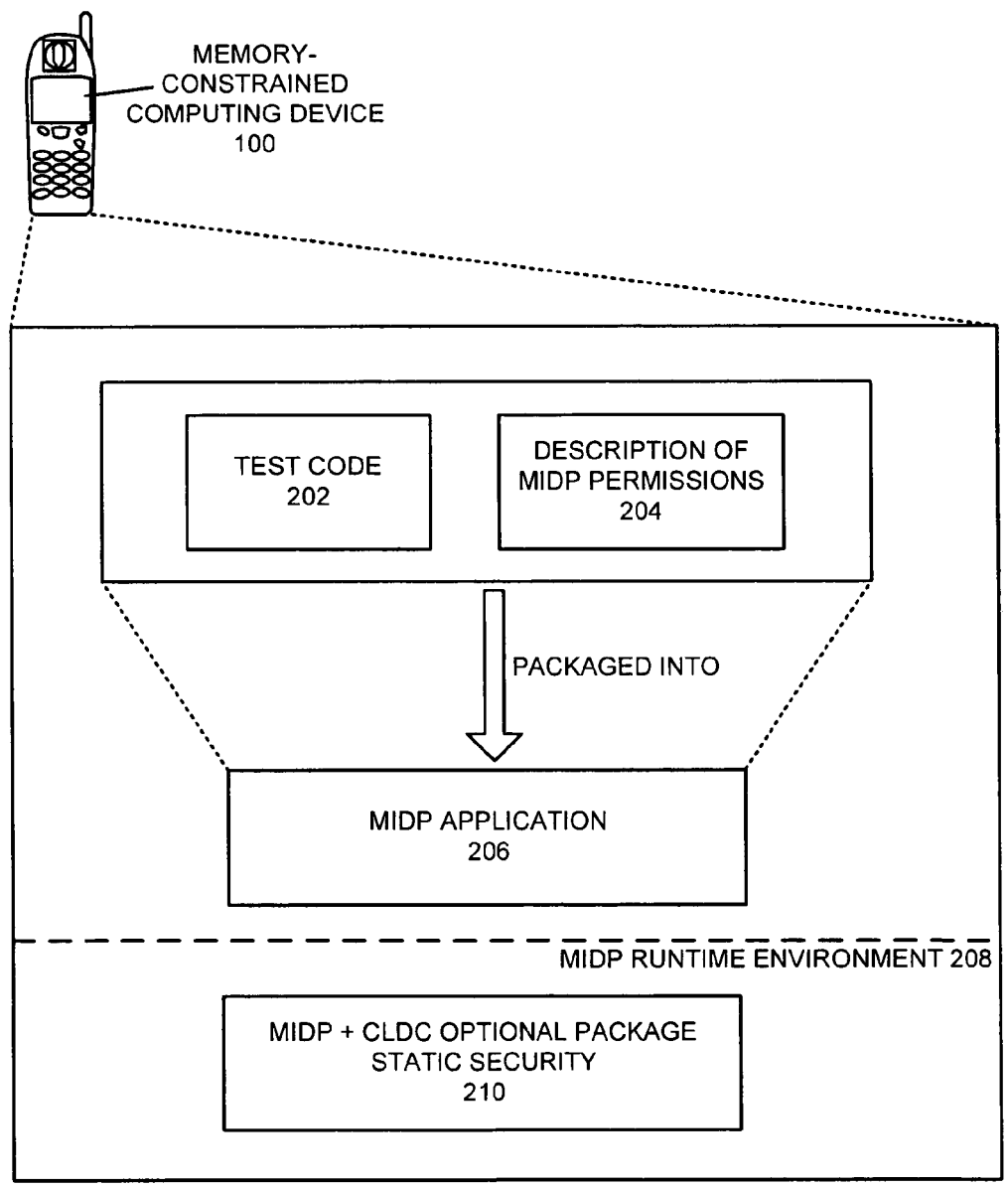
FIG. 2 illustrates a TCK executing in the MIDP framework in accordance with an embodiment of the present invention.

FIG. 2 illustrates a TCK executing in the MIDP framework in more detail. The TCK includes test code 202 that executes, for instance, the security application programmer interface (API) of the framework, to verify that the expected results are achieved. A set of meta-data in the form of a description of MIDP permissions 204 describes which permissions should be granted and which should be denied for the security tests to execute properly in the given security environment. The TCK packages the test code 202 and the description of MIDP permissions 204 into a MIDP application 206, which executes in the MIDP runtime environment 208 on top of the static security provided by the MIDP framework and CLDC optional package 210.

If the TCK 102 and the CLDC optional package 104 could execute on a second memory-constrained computing device 108 that supports the CDC framework 110, the knowledge and verification tests included in the TCK could also be used to verify functionality in the CDC framework 110. However, while the MIDP and CDC software stacks both provide an application programmer interface (API) and virtual machine with some substantially similar functionality, the newer CDC offers more capabilities and broadens the application area to a new set of devices such as next-generation mobile telephones and set-top boxes. The MIDP model, in contrast, is somewhat simplistic and geared more towards small devices with limited power and compute capabilities. As a result, some details of their implementation, such as their security environments, differ significantly. The rich CDC security environment supports Java Platform, Standard Edition (J2SE™) and SecurityManager.check calls, and represents security permissions as Java™ objects with multiple parameters that allow fine-grained security. In MIDP, on the other hand, security permissions are represented simply as strings. Furthermore, in MIDP application security is static; the system configures permissions during application installation, and permission status cannot change during application execution. The full J2SE™ permissions supported by CDC, meanwhile, allow dynamic configuration of security for the application, including changing permission status during execution. To execute MIDP-based applications in a CDC environment, a system needs to map strings provided by an application into sets of CDC permissions (in the form of objects) which have substantially similar meanings as in the MIDP environment.

In one embodiment of the present invention, the system extends an application framework to provide an abstraction of another application framework. In a further embodiment, the system extends the CDC framework to provide a MIDP interface that can be used to execute MIDP applications on CDC-enabled devices. Note that the system does not simply emulate the MIDP framework within CDC, but instead re-maps the MIDP permissions into valid CDC security objects with similar security permissions. This security infrastructure allows security-aware MIDP tests to be run in the CDC environment with proper security permissions and enables a unified approach for the testing of security-related features in both MIDP and CDC. This approach allows tests from existing TCKs or CLDC optional packages to be reused with reduced modifications, thereby separating the testing framework from the tested functionality and improving code reusability.

Providing Portability Between Application Frameworks

Important criteria for providing portability between application frameworks include:
  preserving existing applications and tests;
  dynamically granting and denying permissions for test execution;
  converting permissions from the first application framework to the second application framework; and
  isolating changes to a minimal piece of code related to executing security-aware API calls based on the description of the security environment.

Since modifying the large library of existing MIDP applications and tests is undesirable, the system strives to preserve the abstraction and failure modes of an existing application designed for MIDP. To achieve this, the system attempts to provide a transparent on-the-fly transformation between MIDP permissions and the underlying CDC framework. More specifically, the system creates a context for a MIDP- and CLDC-based application to run in that appears (from the application viewpoint) to be a MIDP environment, but is actually a CDC environment.

Figure 3:
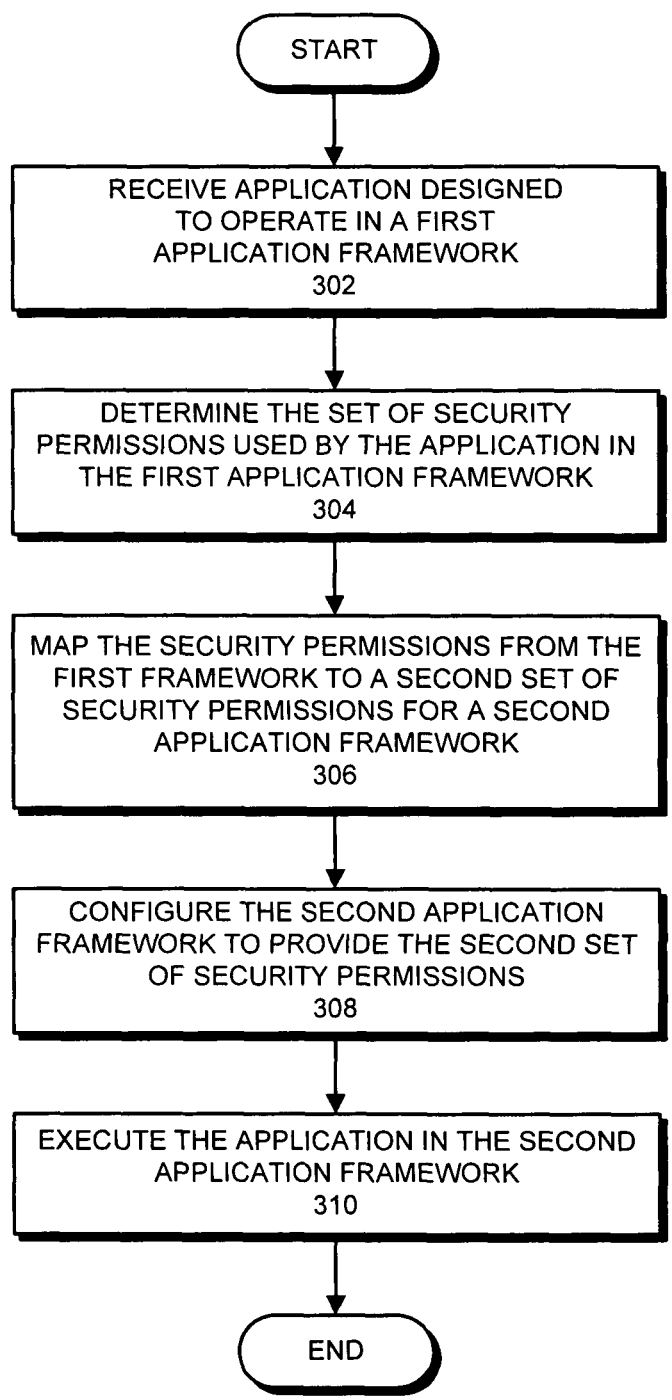
FIG. 3 presents a flowchart that illustrates transformation of security permissions from a first application framework to a second application framework in accordance with an embodiment of the present invention.

FIG. 3 presents a flowchart that illustrates transformation of security permissions from a first application framework, such as MIDP, to a second application framework, such as CDC. First, the system receives an application or test designed to operate in the first application framework (step 302). Next, the system determines the set of security permissions used by the application in the first application framework (step 304). These security permissions are then mapped to a second set of security permissions for the second application framework (step 306). The system configures the second application framework to provide the second set of security permissions (step 308), after which the application executes in the second application framework (step 310). Essentially, the system creates a special security environment for the application that matches the permissions specified.

Figure 4:
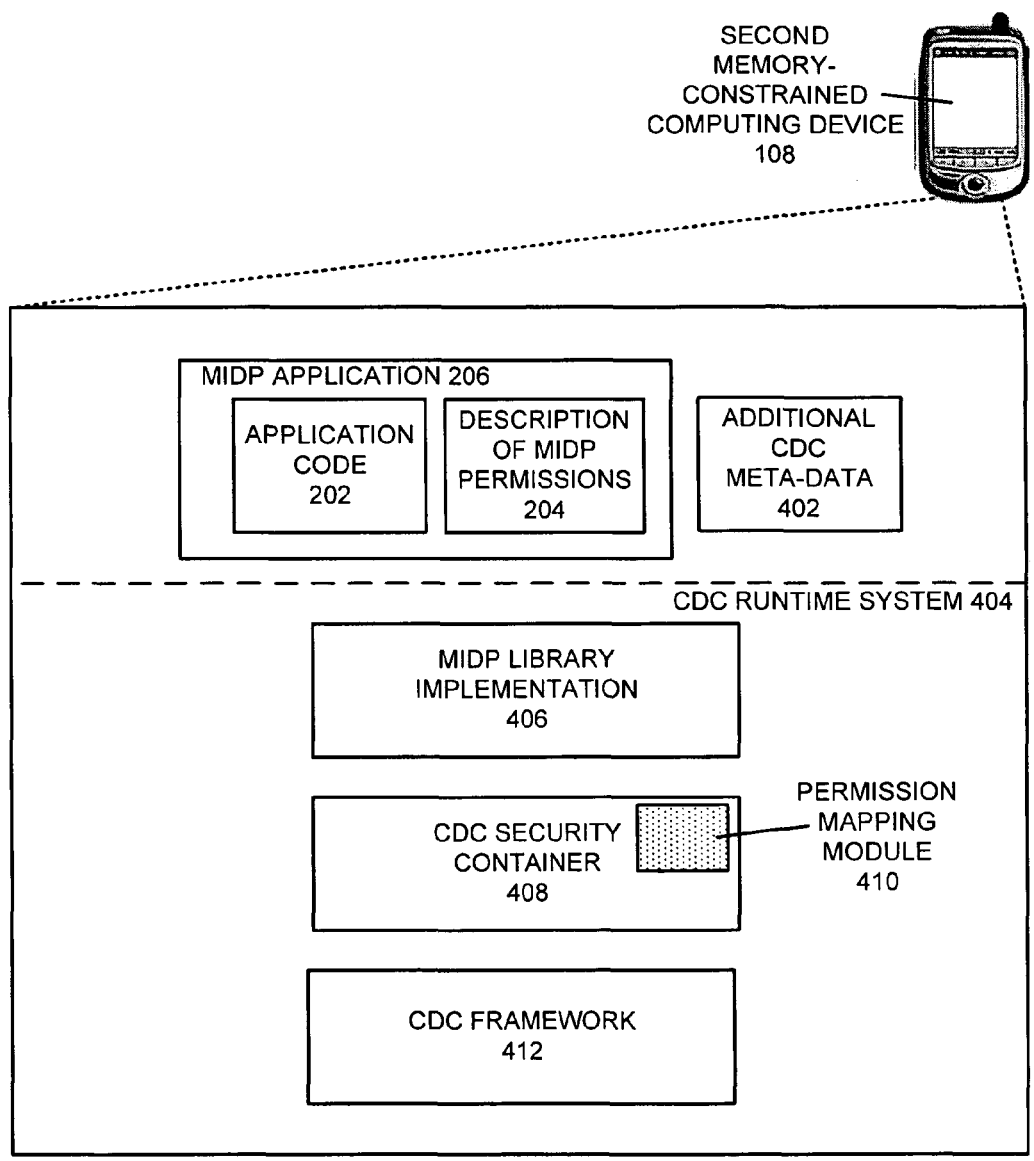
FIG. 4 illustrates a MIDP application executing in a CDC framework in accordance with an embodiment of the present invention.

FIG. 4 illustrates a MIDP application 206 executing in a CDC runtime system 404. Prior to executing the application, the system first examines a set of additional CDC meta-data 402. This additional data, which assists in mapping the MIDP permissions to CDC permissions, can be derived in a number of ways, e.g. during test creation or compilation, application installation, or at runtime. For instance, the system can extract a description of the MIDP permissions 204 (e.g. "javax.microedition.apdu.aid, javax.microedition.apdu.sat") specified in the MIDP security-aware test description and added to the manifest of a Java archive (jar) file via the manifest attribute MIDlet-Permissions, or parse the permissions from a java template (jat) file.

The system transforms the extracted MIDP permissions into a set of comparable CDC permissions for the CDC security environment. Since the CDC security environment is richer than the MIDP environment, this typically involves mapping a simpler set of operations into a more complex set. However, due to the different nature of MIDP and CDC permissions, not all MIDP permissions can be unambiguously mapped to CDC permissions. For example, a granted javax.microedition.io.Connector. socket MIDP permission allows the MIDP application to communicate through sockets. A corresponding CDC permission that allows the application to communicate through sockets uses a java.net.SocketPermission permission and specifies additional information such as a hostname, portname, and operation (e.g. connect, listen, etc.) for the permission. In this case, the system provides additional test-specific security-aware information to execute such MIDP tests on CDC, in the form of a permission-mapping module 408. Such mapping modules may be created on a per-TCK basis, and allow a specific converter and set of security-aware information to be used on a specific test description to map the particular specifications and permissions of each TCK accordingly.

The system uses the resulting set of permission mappings at runtime to instantiate and configure a runtime component that manages the security environment. In one embodiment of the present invention, this runtime component comprises a specific implementation of a security manager (e.g. java.lang.SecurityManager) that obtains or denies the appropriate permissions for each test. This functionality can be provided by a SecurityTestRunner (STR) library that is used as a wrapper for the security-aware tests.

In one embodiment of the present invention, the dynamic security manager and permission mapping module 410 are incorporated in a CDC security container 408. When the application begins to execute, application operations related to MIDP permissions enter the CDC runtime system 404, and are received by a MIDP library implementation 406. The MIDP library implementation 406 presents the requests to the security manager in the CDC security container 408, which determines how the requests should be handled, makes any necessary conversions, and then passes the requests on to the underlying security system in the CDC framework 412.

Figure 5:
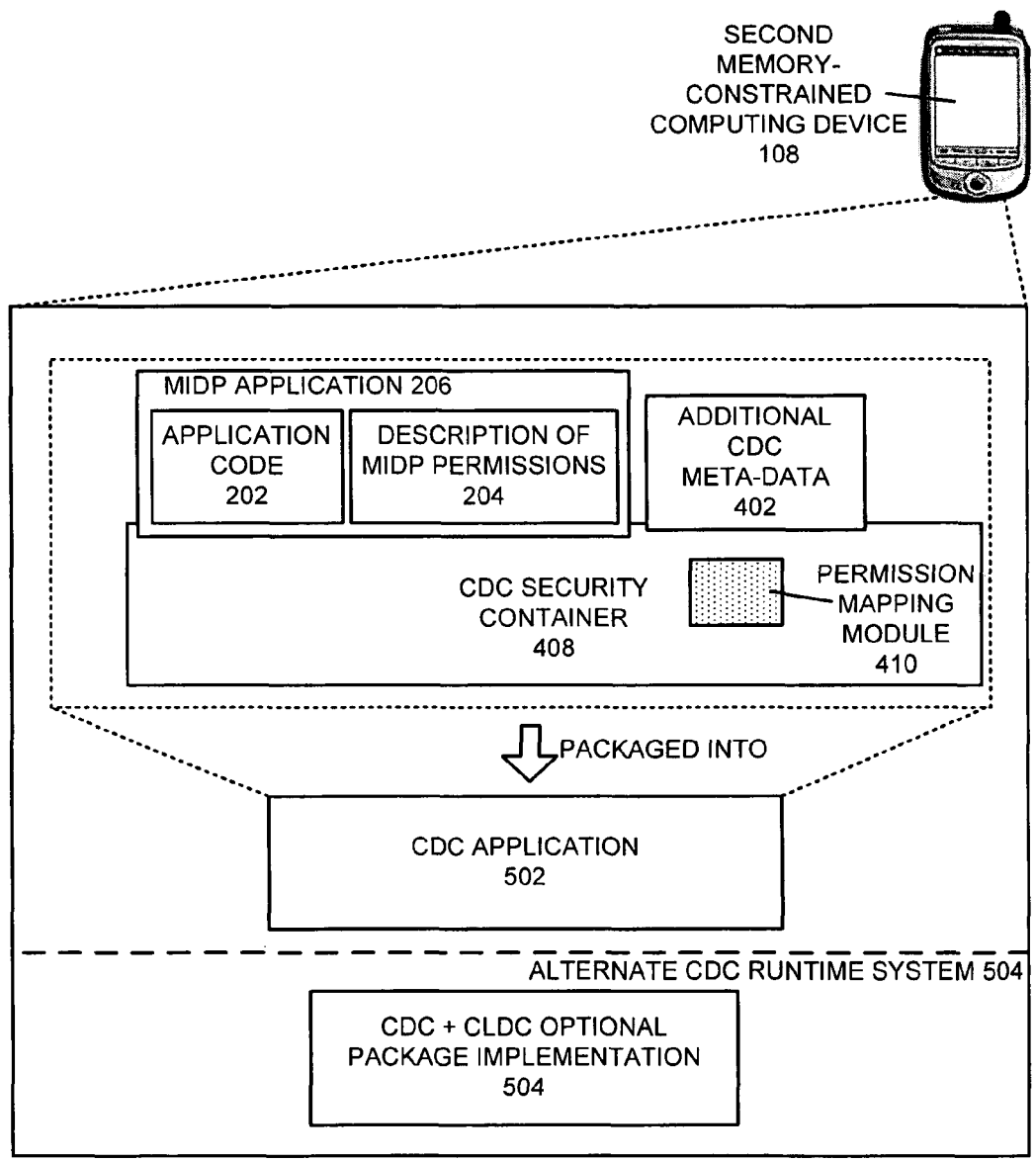
FIG. 5 illustrates a MIDP application packaged in a CDC application in accordance with an embodiment of the present invention.

FIG. 5 illustrates a MIDP application packaged into a CDC application. In another embodiment of the present invention, the MIDP application 206, additional CDC meta-data 402, and CDC security container 408 can instead all be packaged into a CDC application 502. This CDC application 502 makes calls to an alternate CDC runtime system 504, which can comprise a combined CDC and CLDC optional package implementation.

Handling Trusted and Untrusted Execution Modes

A system typically runs MIDP-based applications differently depending on whether they are trusted or untrusted, and test suites typically test both modes. In trusted mode, for instance when MIDlet test suites are signed, the security policy is configured during application installation, and only permissions that are listed in the application descriptor are granted. To confirm than an API throws a security exception when permissions are denied, security tests are included in the application that are not listed in the application descriptor. A second test ensures that the API behaves in a certain way when permission is granted by adding the permission to the descriptor.

Untrusted mode does not include an automatic way to set up permissions at installation time. Instead, policy can only be changed by the user or via proprietary mechanisms. When running tests in untrusted mode, the system considers device security policy to be fixed during a single test run. The user describes a security policy in the configuration editor, and only untrusted tests that fit into the policy are selected for execution. Multiple test runs with different device policy settings may be needed to pass all tests. At minimum, the tests are typically run in a scenario where every permission is granted, and in a separate scenario where every permission is denied.

In contrast, when a TCK test suite is run on CDC, the system can change the security policy dynamically after application installation, for instance by changing the settings for the custom security manager. Since there is no notion of trusted or untrusted in CDC, all tests can be wrapped into the container with the appropriate security and run in one pass. One complication can arise, however, when a platform does not permit such a container to be installed or set up. For instance, some third-party specifications do not allow a custom security manager to be installed for downloaded applications. In this case, the system can:

Ignore failures when setting up runtime security;

Ignore potential problems with the security manager installation; and/or

Account for the possibility of failure when setting up runtime security. This last implementation is similar to the MIDP untrusted mode, in which the security policy is fixed for a single run, and multiple runs with different test selections are used to ensure that all tests pass.

In summary, the present invention allows applications and tests designed for one type of security environment to be hosted transparently in a second security environment. The techniques described in the present invention are applied to MIDP and CDC, so that a CDC-based device can transparently host, and thereby re-use, MIDP security-aware applications and tests. The system grants and denies requested permissions substantially the same in the hybrid MIDP/CDC system as in the original MIDP framework.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for executing an application in a framework, comprising:

in a computing device, receiving an application designed to operate in a first application framework;

determining a first set of security permissions used by the application in the first application framework;

mapping the first set of security permissions used by the application in the first application framework to a second set of security permissions for a second application framework, wherein mapping the security permissions involves converting each security permission from the first set of security permissions that is not present in the second set of security permissions into a related security permission in the second set of security permissions;

configuring the second application framework to provide the second set of security permissions; and executing the application in the second application framework;

whereby the application can execute transparently and with substantially similar security behavior in the second application framework.

2. The method of claim 1, wherein the application is associated with security meta-data that assists in determining the second set of security permissions; and wherein the security meta-data can be created when the application is created or when the application is installed.

3. The method of claim 2, wherein creating the security meta-data involves creating the security meta-data based on a user-generated specification that specifies the first set of security permissions used by the application.

4. The method of claim 3, wherein determining the first set of security permissions and/or the security meta-data involves analyzing the application to determine security needs of the application.

5. The method of claim 4, wherein generating the first set of security permissions, the second set of security permissions, and/or the security meta-data involves using a mapping interface that maps security permissions from the first application framework to security permissions in the second application framework.

6. The method of claim 5, wherein using the mapping interface involves using a table that maps security permission requests for the first application framework to security permissions in the second application framework.

7. The method of claim 1, wherein configuring the second application framework involves:
   instantiating at runtime a security manager to receive requests for security permissions from the application; and
   configuring the security manager based on the first set of security permissions determined for the application;
   wherein the security manager creates a special security environment for the application that matches the security permissions specified for the first application framework to equivalent security permissions in the second application framework.

8. The method of claim 1,
   wherein the first application framework includes the Mobile Information Device Profile (MIDP) application framework; and
   wherein the second application framework includes the Connected Device Configuration (CDC) application framework.

9. A non-transitory computer-readable storage medium storing instructions that when executed by a computer cause the computer to perform a method for executing an application in a framework, the method comprising:
   receiving an application designed to operate in a first application framework;
   determining a first set of security permissions used by the application in the first application framework;
   mapping the first set of security permissions used by the application in the first application framework to a second set of security permissions for a second application framework, wherein mapping the security permissions involves converting each security permission from the first set of security permissions that is not present in the second set of security permissions into a related security permission in the second set of security permissions;
   configuring the second application framework to provide the second set of security permissions, and provide additional security-aware information for the second set of permissions that is not available in the first set of permissions; and
   executing the application in the second application framework;
   whereby the application can execute transparently and with substantially similar security behavior in the second application framework.

10. The non-transitory computer-readable storage medium of claim 9, wherein the application performs a set of tests that confirm the functionality of the application framework.

11. The non-transitory computer-readable storage medium of claim 9, wherein the application is associated with security meta-data that assists in determining the second set of security permissions; and
   wherein the security meta-data can be created when the application is created or when the application is installed.

12. The non-transitory computer-readable storage medium of claim 11, wherein creating the security meta-data involves creating the security meta-data based on a user-generated specification that specifies the first set of security permissions used by the application.

13. The non-transitory computer-readable storage medium of claim 12, wherein determining the first set of security permissions and/or the security meta-data involves analyzing the application to determine security needs of the application.

14. The non-transitory computer-readable storage medium of claim 13, wherein generating the first set of security permissions, the second set of security permissions, and/or the security meta-data involves using a mapping interface that maps security permissions from the first application framework to security permissions in the second application framework.

15. The non-transitory computer-readable storage medium of claim 14, wherein using the mapping interface involves using a table that maps security permission requests for the first application framework to security permissions in the second application framework.

16. The non-transitory computer-readable storage medium of claim 9, wherein configuring the second application framework involves: instantiating at runtime a security manager to receive requests for security permissions from the application; and configuring the security manager based on the first set of security permissions determined for the application;
   wherein the security manager creates a special security environment for the application that matches the security permissions specified for the first application framework to equivalent security permissions in the second application framework.

17. The non-transitory computer-readable storage medium of claim 9, wherein the first application framework includes the Mobile Information Device Profile (MIDP) application framework; and wherein the second application framework includes the Connected Device Configuration (CDC) application framework.

18. A computer system that executes an application in a framework, comprising:
   a processor;
   a memory;
   wherein the computer system is configured to,
      receive an application designed to operate in a first application framework,
      determine a first set of security permissions used by the application in the first application framework,
      map the first set of security permissions used by the application in the first application framework to a second set of security permissions for a second application framework, wherein mapping the security permissions involves converting each security permission from the first set of security permissions that is not present in the second set of security permissions into a related security permission in the second set of security permissions,
      configure the second application framework to provide the second set of security permissions, and provide additional security-aware information for the second set of permissions that is not available in the first set of permissions, and to execute the application in the second application framework, whereby the application can execute transparently and with substantially similar security behavior in the second application framework.

19. The computer system of claim 18, wherein the application performs a set of tests that confirm the functionality of the application framework.

20. The method of claim 1, wherein converting each security permission from the first set of security permissions that is not present in the second set of security permissions into the related security permission in the second set of security permissions involves:

analyzing the application to determine additional security information for the application used to enable the security permission in the second set of security permissions; and including the security information with the converted security permission.

\* \* \* \* \*

UNITED STATES PATENT AND TRADEMARK OFFICE
CERTIFICATE OF CORRECTION

PATENT NO.         : 8,943,601 B1
APPLICATION NO.    : 11/408127
DATED              : January 27, 2015
INVENTOR(S)        : Zelov Page 1 of 1

It is certified that error appears in the above-identified patent and that said Letters Patent is hereby corrected as shown below:

In the specification

In column 4, line 56, delete "Java" and insert -- java --, therefor.

Signed and Sealed this
Seventeenth Day of November, 2015

Michelle K. Lee
*Director of the United States Patent and Trademark Office*